May 3, 1927.
C. A. LANDGREN ET AL
1,627,099
ATTACHMENT FOR FRYING PANS
Filed Feb. 11, 1926
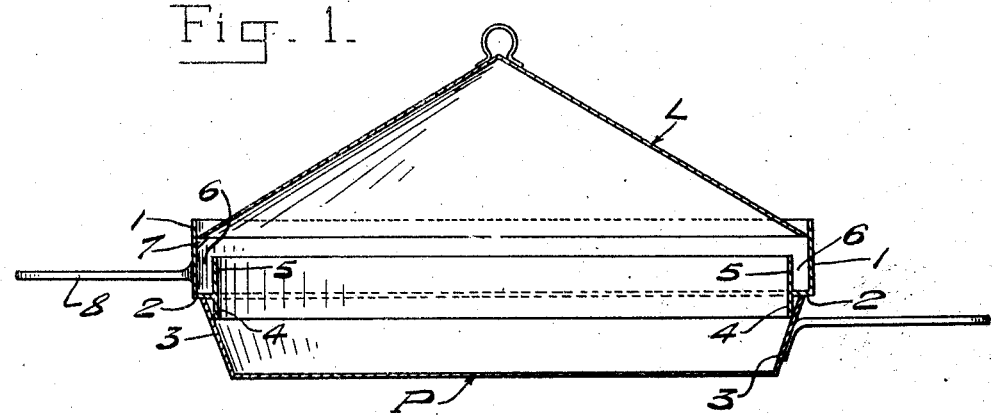
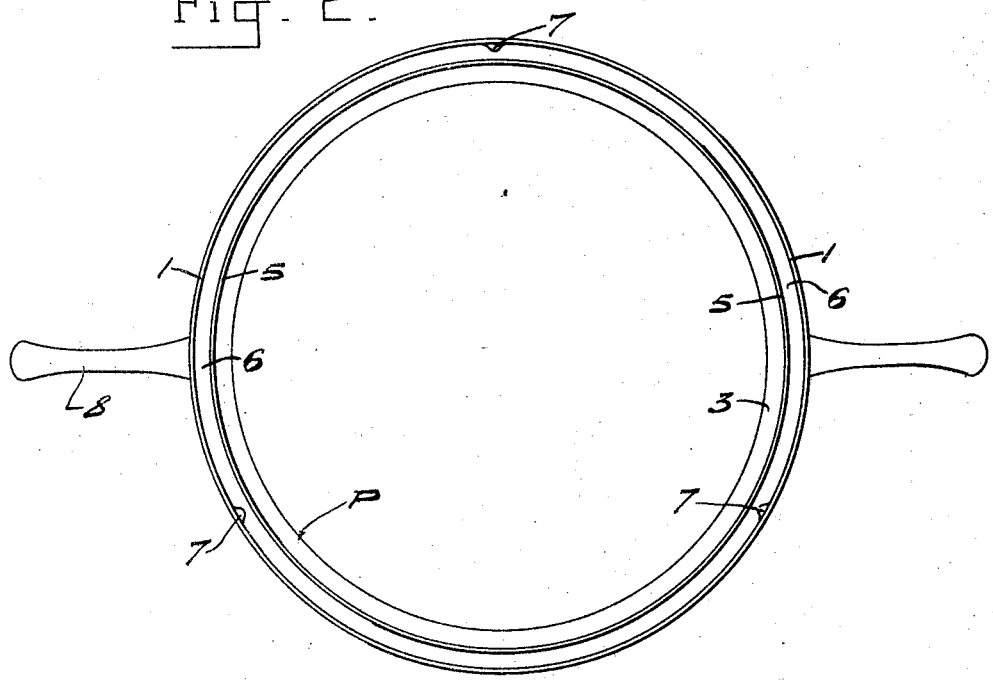
Inventor
Charles A. Landgren,
Julia A. Landgren
By Watson E. Coleman.
Attorney Patented May 3, 1927.

1,627,099

UNITED STATES PATENT OFFICE.

CHARLES A. LANDGREN AND JULIA A. LANDGREN, SILVERTON, OREGON.

ATTACHMENT FOR FRYING PANS.

Application filed February 11, 1926. Serial No. 87,641.

This invention relates to attachments for frying pans and it is an object of the invention to provide a device of this kind which provides an effective medium to avoid grease from splattering when the pan is in use.

Another object of the invention is to provide a device of this kind adapted to be rested from above directly upon the side walls of the frying pan and which is provided with means to collect the grease or the like which may splash out of the pan during a cooking operation.

The invention consists in the details of construction and in the combination and arrangement of the several parts of our improved attachment for a frying pan whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawing, wherein:—

Figure 1 is a vertical sectional view taken through an attachment constructed in accordance with an embodiment of our invention in applied position;

Figure 2 is a view in top plan of the attachment unapplied with the lid removed.

As disclosed in the accompanying drawing, P denotes a frying pan of a conventional type with which our improved attachment is adapted to be employed.

As herein disclosed, said attachment comprises an annular rim or member 1 of predetermined height and which has its lower marginal portion defined by an inwardly disposed flange 2 which is adapted to be rested directly upon the upper edge of the side wall 3 of the pan. This flange 2 extends inwardly from the rim or member 1 and has its inner marginal portion continued by a depending flange 4 which is adapted to extend within the pan P and have close contact with the side wall 3 of such pan.

The inner marginal portion of the flange 2 is also defined by an upstanding flange 5 of desired height but of a height to terminate a distance below the upper margin of the rim or member 1. The flanges 2 and 5 together with the rim or member 1 provide an annular collecting chamber 6 replacing the periphery of the pan P when the attachment is in applied position and which is adapted to receive grease or the like splattered from the pan P during a cooking operation and also to receive the condensation of steam which may rise from the pan.

The rim or member 1 at predetermined points spaced circumferentially therearound and at a point below the upper edge of said rim but above the flange 5 is provided with the inwardly directed lugs 7 which provide supports for the lid L. The lid L, as herein disclosed, is conical in form and having its major diameter such as to permit the base or lower portion of the lid L to fit substantially snug within the upper portion of the rim or member 1 and rest upon the lugs 7.

The rim or member 1 also has secured thereto an outstanding and substantially radially disposed handle member 8.

During a cooking operation, grease or the like which may splatter from the pan and the steam as condensed will have a tendency to form on the inner face of the applied lid L and drain downwardly therefrom into the collecting chamber 6 and thus prevent the grease or the like from being indiscriminately scattered upon the stove top or elsewhere.

From the foregoing description it is thought to be obvious an attachment for frying pans constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:—

An attachment for a frying pan, comprising a continuous rim, an inwardly disposed flange at the inner edge of said rim adapted to rest upon the upper marginal portion of the pan, an upstanding flange formed upon the inner edge of the inwardly disposed flange in spaced relation with the rim to form an annular collecting chamber, a depending flange at the inner edge of the inwardly disposed flange adapted to engage the inner wall of the pan below the marginal edge thereof, a plurality of circumferentially spaced lugs arranged upon the inner wall of the rim adjacent the upper edge thereof and a conical shaped lid having its base edge adapted to rest upon said lugs.

In testimony whereof we hereunto affix our signatures.

CHARLES A. LANDGREN.
JULIA A. LANDGREN.